US012756843B2

(12) United States Patent
Yoon et al.

(10) Patent No.: US 12,756,843 B2
(45) Date of Patent: Oct. 6, 2026

(54) IMPLICIT SUB-PEL POSITION DERIVATION FOR TEMPLATE MATCHING-BASED INTRA PREDICTION

(71) Applicant: Tencent America LLC, Palo Alto, CA (US)

(72) Inventors: Yonguk Yoon, Palo Alto, CA (US); Lien-Fei Chen, Palo Alto, CA (US); Han Gao, Palo Alto, CA (US); Biao Wang, Palo Alto, CA (US); Roman Chernyak, Palo Alto, CA (US); Shan Liu, Palo Alto, CA (US); Motong Xu, Palo Alto, CA (US); Ziyue Xiang, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 19/047,508

(22) Filed: Feb. 6, 2025

(65) Prior Publication Data

US 2025/0260831 A1 Aug. 14, 2025

Related U.S. Application Data

(60) Provisional application No. 63/553,492, filed on Feb. 14, 2024.

(51) Int. Cl.

| | |
|---|---|
| ***H04N 19/154*** | (2014.01) |
| ***H04N 19/156*** | (2014.01) |
| ***H04N 19/159*** | (2014.01) |
| ***H04N 19/176*** | (2014.01) |
| ***H04N 19/70*** | (2014.01) |

(52) U.S. Cl.
CPC ......... *H04N 19/176* (2014.11); *H04N 19/159* (2014.11); *H04N 19/70* (2014.11)

(58) Field of Classification Search
CPC ..... H04N 19/176; H04N 19/159; H04N 19/70
See application file for complete search history.

(56) References Cited

U.S. PATENT DOCUMENTS

| | | | | |
|---|---|---|---|---|
| 2021/0227243 | A1* | 7/2021 | Wu | H04N 19/176 |
| 2021/0329257 | A1* | 10/2021 | Sethuraman | H04N 19/119 |
| 2024/0267533 | A1* | 8/2024 | Zhang | H04N 19/154 |

FOREIGN PATENT DOCUMENTS

| | | | | |
|---|---|---|---|---|
| CN | 115052162 | A | 9/2022 | |
| CN | 116437101 | A | 7/2023 | |
| CN | 117529919 | A | 2/2024 | |
| GB | 2595195 | A * | 7/2017 | H04N 19/109 |

(Continued)

OTHER PUBLICATIONS

Tencent America LLC, ISR/WO, PCT/US2025/015142, Apr. 4, 2025, 13 pgs.

*Primary Examiner* — Patrick E Demosky
(74) *Attorney, Agent, or Firm* — Morgan, Lewis & Bockius LLP

(57) ABSTRACT

The various implementations described herein include methods and systems for coding video. In one aspect, a method includes receiving a video bitstream comprising a plurality of blocks that includes a current block; identifying a block vector for the current block; determining a minimum-cost position in a predetermined area of a location indicated by the block vector; deriving a sub-pixel position based on the minimum-cost position; and reconstructing the current block using the sub-pixel position.

18 Claims, 7 Drawing Sheets

(56) References Cited

FOREIGN PATENT DOCUMENTS

| | | | |
|---|---|---|---|
| GB | 2595195 | B | 4/2022 |
| JP | 7331095 | B2 | 8/2023 |
| KR | 101176903 | B1 | 8/2012 |
| WO | WO 2020173483 | A1 | 9/2020 |

* cited by examiner

IMPLICIT SUB-PEL POSITION DERIVATION FOR TEMPLATE MATCHING-BASED INTRA PREDICTION

RELATED APPLICATIONS

This application claims priority to U.S. Provisional Patent Application No. 63/553,492, entitled "Implicit Sub-pel Position Derivation for Template Matching-based Intra Prediction" filed Feb. 14, 2024, which is hereby incorporated by reference in its entirety.

TECHNICAL FIELD

The disclosed embodiments relate generally to video coding, including but not limited to systems and methods for intra predictions and subpixel derivations.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released. Enhanced Compression Model (ECM) is a video coding standard that is currently under development. ECM aims to significantly improve compression efficiency beyond existing standards like HEVC/H.265 and VVC, essentially allowing for higher quality video at lower bitrates.

SUMMARY

The present disclosure describes amongst other things, a set of methods for video (image) compression, more specifically related to deriving a sub-pixel position for template matching-based intra prediction. Some embodiments include deriving the sub-pixel position based on a minimum-cost position within a search window associated with a block vector (BV). For example, the sub-pixel position is implicitly derived without signaling a flag that indicates which direction the sub-pixel position is located at or an index indicating which fractional point or sub-pixel position is used for interpolation. Implicitly deriving the sub-pixel position may help reduce the signaling overhead associated with the described method (as compared to approaches that signal the sub-pixel position). Using the sub-pixel position for template matching-based intra prediction can further improve coding accuracy, e.g., by using a prediction block that is more closely matched with the current block.

In accordance with some embodiments, a method of video decoding is provided. The method includes (i) receiving a video bitstream (e.g., a coded video sequence) comprising a plurality of blocks (e.g., corresponding to a set of pictures) that includes a current block; (ii) identifying a block vector for the current block; (iii) determining a minimum-cost position in a predetermined area of a location indicated by the block vector; (iv) deriving a sub-pixel position based on the minimum-cost position and (iv) reconstructing the current block using the sub-pixel position.

In accordance with some embodiments, a method of video encoding includes (i) receiving video data (e.g., a source video sequence) comprising a plurality of blocks (e.g., corresponding to a set of pictures) that includes a current block. The method includes (ii) identifying a block vector for the current block; (iii) determining a minimum-cost position in a predetermined area of a location indicated by the block vector; (iv) deriving a sub-pixel position based on the minimum-cost position; and (v) encoding the current block using the sub-pixel position.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes video/image compression techniques including determining sub-pixel positions, e.g., for template matching-based intra predictions. For example, a minimum-cost position may be determined in a predetermined area of a location indicated by a block vector associated with a current block. A sub-pixel position may be determined, for example, implicitly, based on the minimum-cost position, and the current block may be reconstructed based on the sub-pixel position. Implicitly determining the sub-pixel position rather than signaling it reduces signaling overhead. Additionally, using a sub-pixel position that is associated with a minimum-cost position to reconstruct a current block may improve coding accuracy as compared to using whole pixel positions that are higher cost.

Example Systems and Devices

Figure 1:
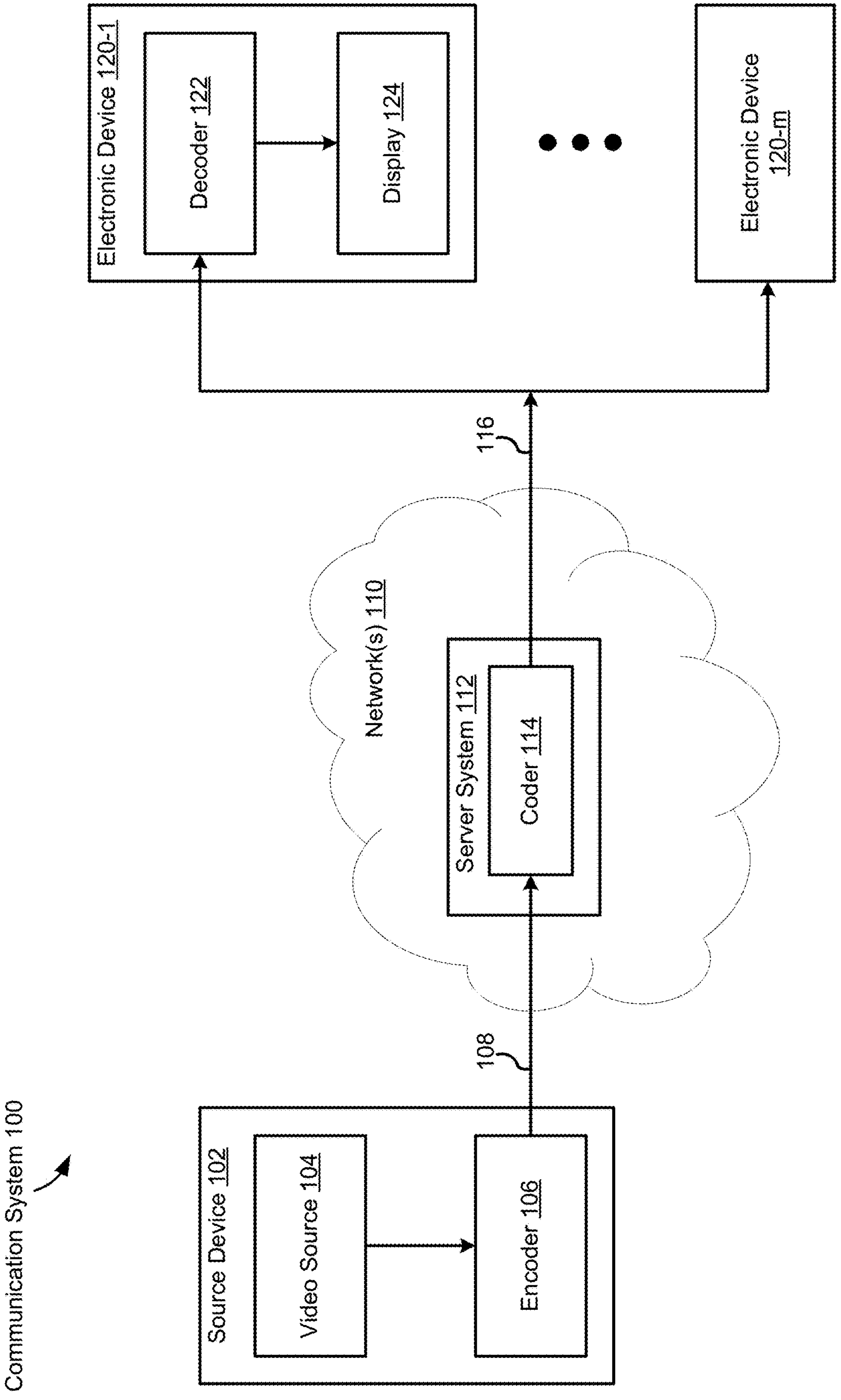
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
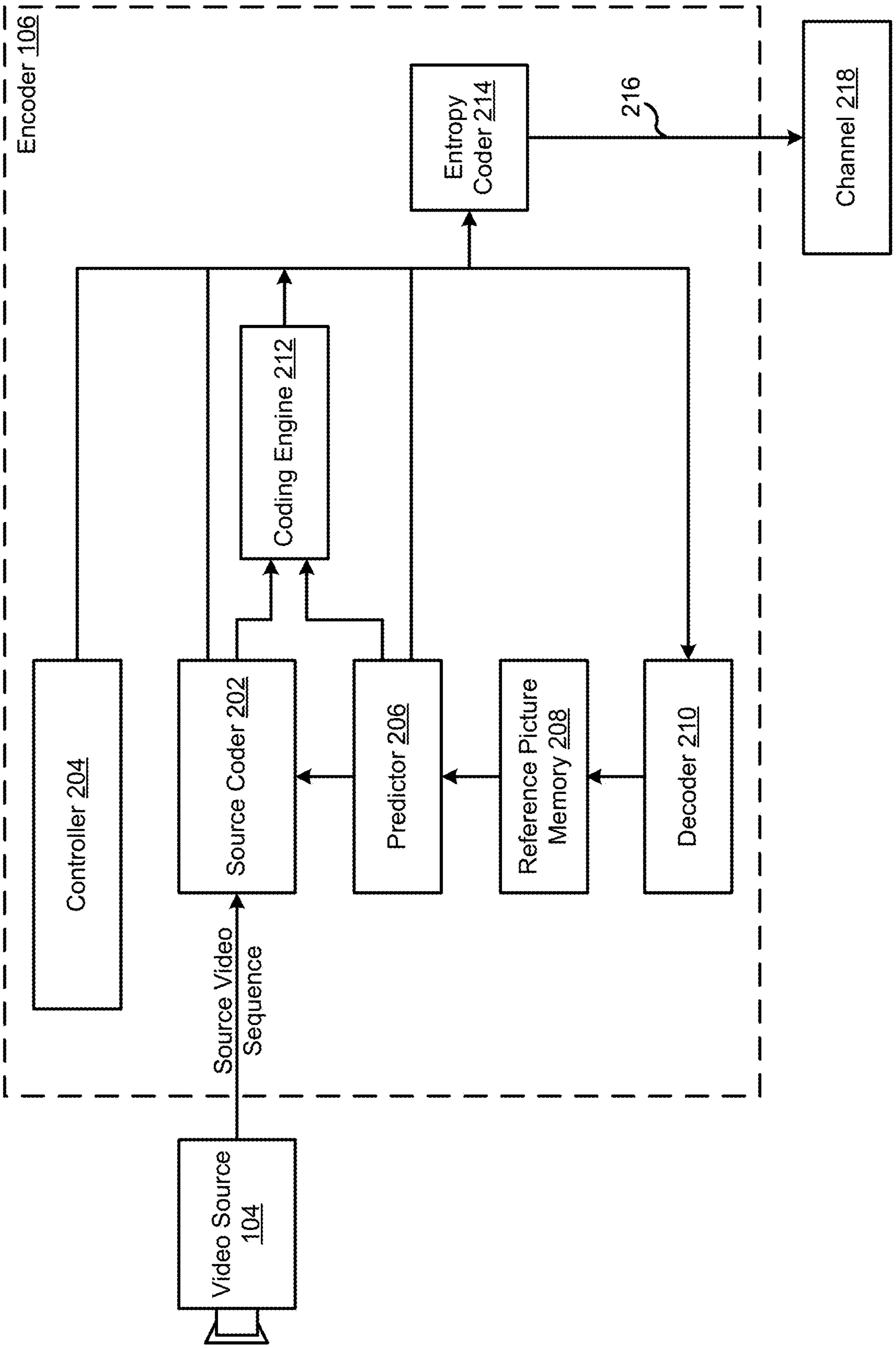
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
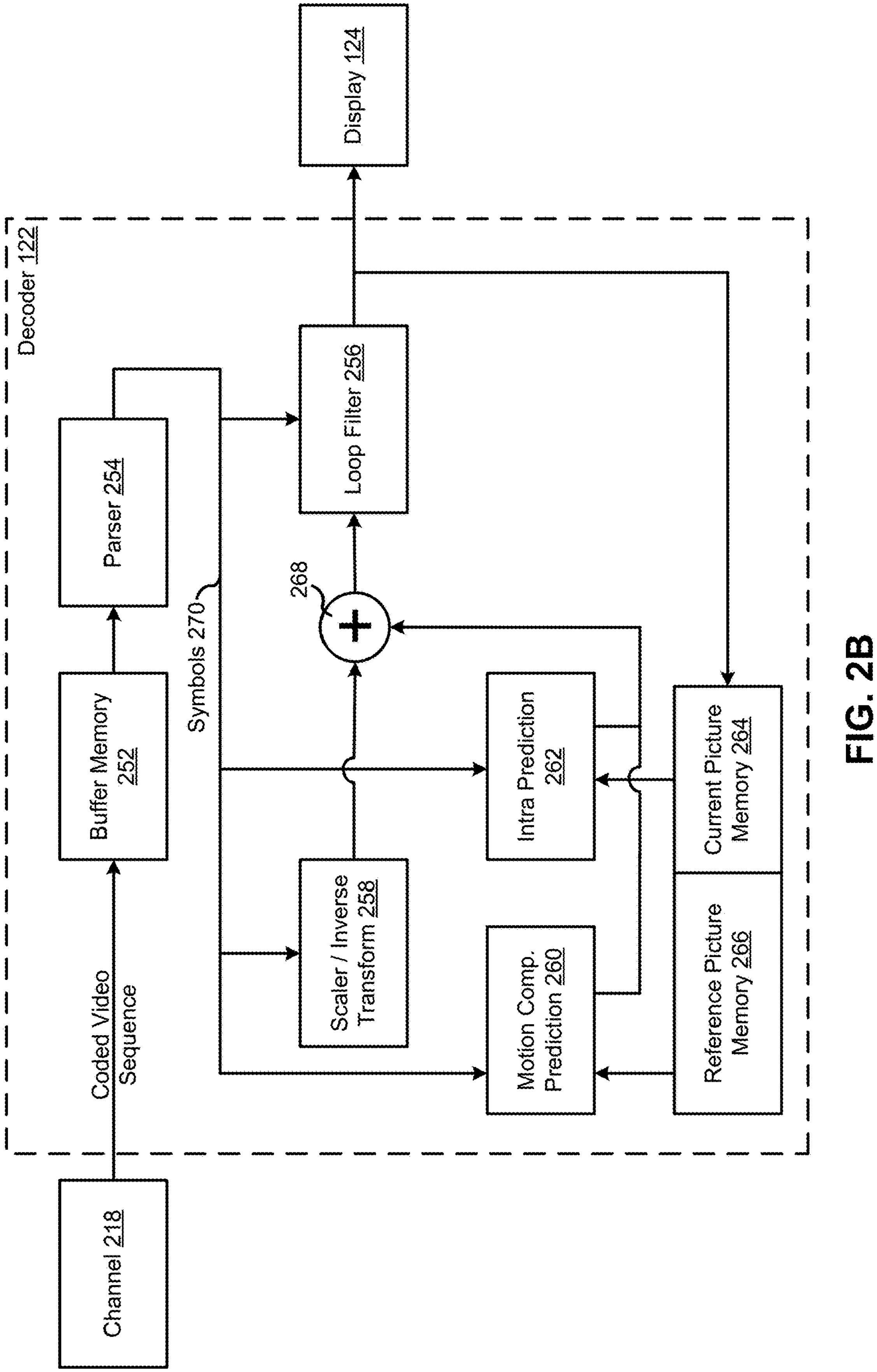
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when sub-sample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
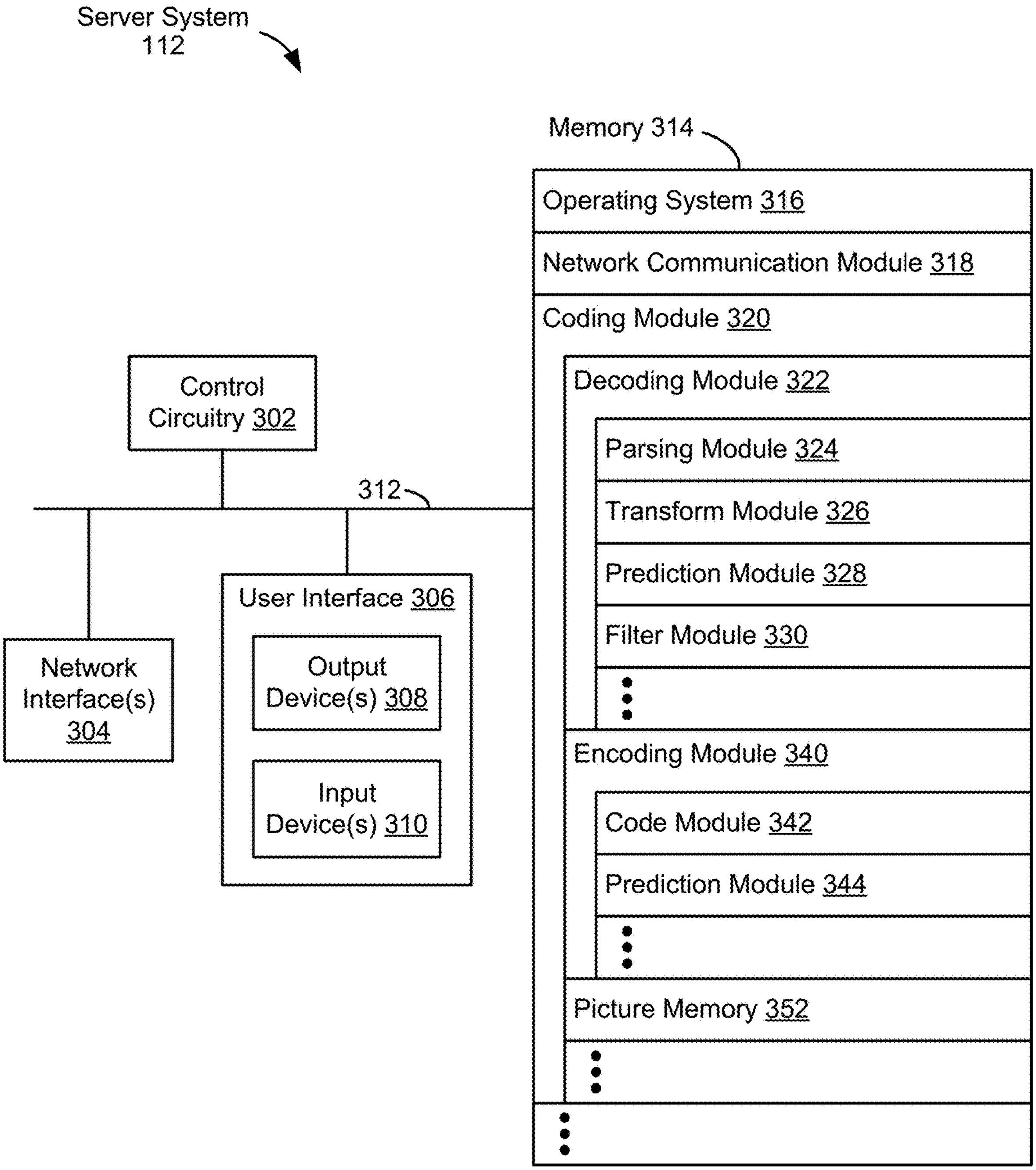
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). According to some embodiments, example methods for deriving sub-pixel positions for intra predictions are described below.

As used herein, a “reference sample” may refer to a reconstructed neighboring sample of a current block or a sequentially predicted sample. Additionally, “block size” or “region size” may refer to a block/region width, height, area size, number of samples in the block/region, max (or min) between block/region width and height, and/or block/region aspect ratio.

Figure 4A:
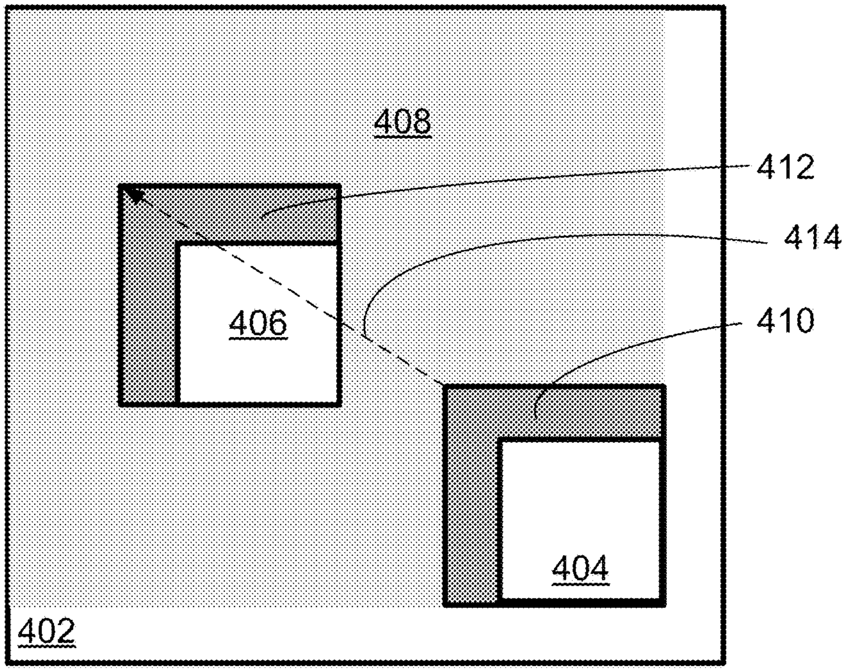
FIG. 4A illustrates using a template matching process (e.g., intra-template matching) to identify a block vector (BV) of a current block in accordance with some embodiments.

FIG. 4A illustrates using a template matching process (e.g., an intra-template matching process sometimes referred to as IntraTMP) to identify a BV of a current block in accordance with some embodiments. A current picture 402 includes a current block 404 and a reconstructed area 408. The current block 404 is outside the reconstructed area 408. The current block 404 has a template 410 that includes a number of reconstructed samples (e.g., that are in the reconstructed area 408). A distortion between the template 410 and other templates within the reconstructed samples may be calculated, and a prediction block 406 may be identified, which is associated with a template 412 having the smallest distortion, or the lowest template-matching cost (e.g., based on a sum of absolute difference (SAD), a sum of absolute transformed differences (SATD), a sum of squared error (SSE), or another metric). FIG. 4A shows an example in which the prediction block 406 is non-adjacent to the current block 404. In some embodiments, the prediction block is adjacent to the current block 404. FIG. 4A shows an example of a template having a top and left region. In some embodiments, a template has a different shape (e.g., corresponding to only the left region or only the top region). In some embodiments, the template has a different height and/or width (e.g., that is signaled or derived based on coded information).

A BV 414 of the current block 404 is derived via a vector that points from the current block 404 (e.g., from a portion of the template 410 of the current block 404, to a corresponding portion of the template 412 of the prediction block 406) to the prediction block 406. In some embodiments, intra prediction mode information (e.g., intra prediction mode or other information) of the prediction block 406 is derived and used for the prediction of the current block 404 (e.g., the intra prediction mode of the current block 404 is set to the same intra prediction mode of the prediction block 406).

Figure 4B:
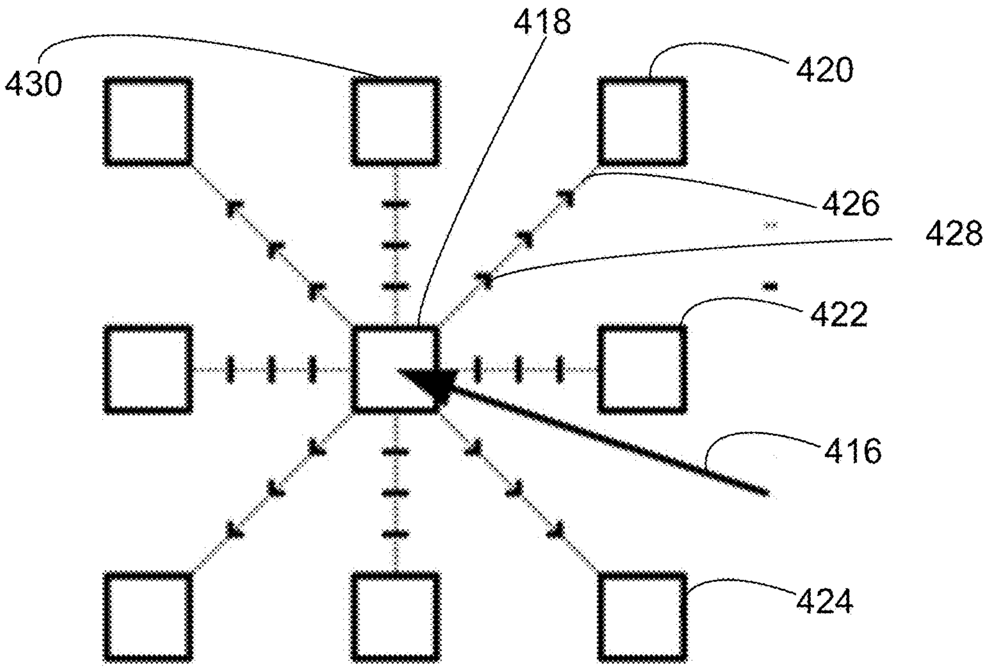
FIG. 4B illustrates an example of a sub-pixel (sub-pel) derivation technique.

FIG. 4B illustrates an example of a sub-pel derivation technique. In this example, an initial BV 416 having the components ($bv_x$, $bv_y$) in the x and y directions, respectively, points to a pixel 418 located at an integer pixel (e.g., integer-pel) position (e.g., within a template of a prediction block). A more accurate prediction block (e.g., a prediction block that is better or more precisely matched to the current block) may be found by searching not only at the integer pixel positions (e.g., at a pixel 420, a pixel 422, a pixel 424, and a pixel 430) in a vicinity of the pixel 418 but also at sub-pixel positions. For example, the sub-pixel positions may extend along 8 different directions, as indicated by dotted lines, and at different distances along the dotted directional lines. FIG. 4B illustrates, as an example, a ¼-pel interpolation scheme (e.g., a distance between two adjacent pixels arranged at integer-pixel locations is divided into four equal portions) in which a first sub-pel position 428 is located along a first direction 426 between the pixel 418 and the pixel 420. In some embodiments, as illustrated in FIG. 4B, distances between consecutive sub-pel locations along the diagonal directional lines may be different (e.g., larger) than distances between consecutive sub-pel locations along a horizontal direction (e.g., between the pixel 418 and the pixel 422) and/or a vertical direction (e.g., between the pixel 418 and the pixel 430).

In some embodiments, instead of signaling the direction and/or the distances associated with a sub-pel location that provide a more accurate prediction block, the sub-pel location is implicitly derived. For example, instead of signaling a sub-pel flag indicating a specific direction among the 8 directions for sub-pel interpolation and signaling a sub-pel index indicating which fractional point is used for sub-pel interpolation, the methods and systems described herein include implicitly deriving the sub-pel location for the prediction block.

Figure 4C:
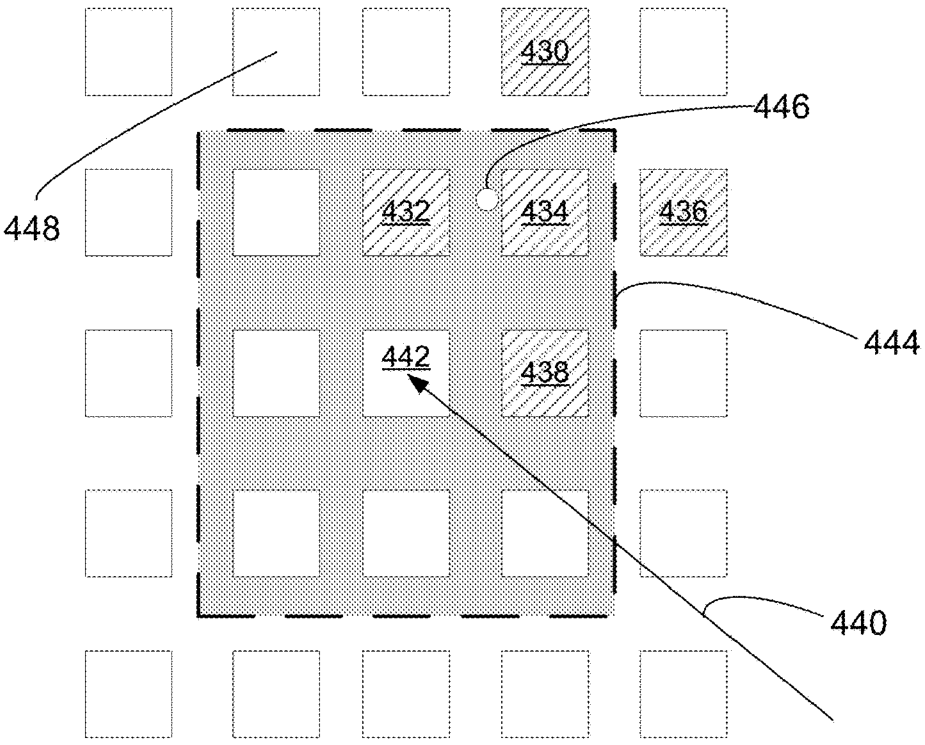
FIG. 4C illustrates an example sub-pel position derivation technique in accordance with some embodiments.

In some embodiments, a sub-pel position is derived by calculating template costs within a pre-defined N×M search window from an initial BV (e.g., the initial BV 416 in FIG. 4B), where N and M are non-zero positive integer values. FIG. 4C illustrates an example sub-pel position derivation technique in accordance with some embodiments. As an example, an initial BV 440 points from a portion of a template of a current block to a pixel 442. Template costs are calculated at the various integer pixel locations within a search window 444 of the pixel 442. In the example illustrated in FIG. 4C, the search window 444 is a 3×3 search window around the pixel 442 (e.g., N and M are both 3 in the example illustrated in FIG. 4C). In some embodiments, other search window sizes are used. As an example, a minimum template cost is calculated for a pixel 434, and this minimum template cost position ($bv_x+1$, $bv_y-1$) is associated with a center cost, E(0,0). Four additional template costs at integer pixel locations in a vicinity of the pixel 434 are calculated (e.g., at a pixel 430, a pixel 436, a pixel 438, and a pixel 432). For example, the template cost of the pixel 438 is denoted as cost E(0,1), the template cost of the pixel 436 is denoted as cost E(1,0), the template cost of the pixel 432 is denoted as cost E(−1,0), and the template cost of the pixel 430 is denoted as cost E(0,−1). The sub-pel position ($x_m$, $y_m$) is derived by solving a parabolic equation with the five known template costs, including the center cost and the four template costs around the center position as shown in FIG. 4C (e.g., the upper, lower, left and right pixels to the center pixel 434).

$$E(x, y) = A(x - x_m)^2 + B(y - y_m)^2 + C \quad \text{Equation 1}$$

$$x_m = \frac{E(-1, 0) - E(1, 0)}{2(E(-1, 0) + E(1, 0) - 2E(0, 0))} \quad \text{Equation 2}$$

$$y_m = \frac{E(0, -1) - E(0, 1)}{2(E(0, -1) + E(0, 1) - 2E(0, 0))} \quad \text{Equation 3}$$

where E(x, y) denotes a template cost at integer position (x, y), A, B, and C are different constants that may have different or identical values. An interpolation filter may be applied to generate a sub-pixel 446 at the sub-pel position ($x_m$, $y_m$).

In some embodiments, the sub-pel derivation method described above is applied when template matching-based intra prediction is used for predicting a current block. In some embodiments, a flag indicating whether the sub-pel derivation method described above is applied or not is signaled in the bitstream. For example, when the sub-pel derivation method described above is the only available sub-pel prediction method, the sub-pel derivation method is applied (e.g., used exclusively) when the signaled flag indicates usage of the sub-pel derivation method. In some scenarios, the sub-pel derivation method described above is one of several available sub-pel prediction methods, and the sub-pel derivation method may be selected (e.g., used exclusively, or used jointly with one or more other sub-pel derivation methods) when the signaled flag indicates selection of the sub-pel derivation method.

In some embodiments, a sub-pel resolution is selected among one or more resolutions. For example, in some embodiments, the sub-pel resolution is fixed at ¼ pel resolution. In some embodiments, a sub-pel resolution is selected among different sub-pel resolutions, for example, one or more of ½, ¼, ⅛, and 1/16 sub-pel resolution, optionally ordered in a list. An index syntax flag may be signaled into the bitstream to indicate which resolution within the list is used for the sub-pel derivation method described above.

In some embodiments, the search for a minimum template cost position at integer resolution within a N×M search window (e.g., search window 444) may be conducted via an exhaustive full search, a 3-step search, a diamond search, a hexagonal search, or another search method.

In some embodiments, a final BV does not change (e.g., set to be equal to an initial BV, such as initial BV 440) even when the minimum template cost position is different from the integer pixel associated with the initial BV. For example, in FIG. 4C, the initial BV 440 ($bv_x$, $bv_y$) points to pixel 442, and the minimum template cost position at integer resolution within a 5×5 search range (e.g., all illustrated pixels at integer positions) may be at (−1, −2), for example, corresponding to a pixel 448. In such scenarios, the final BV is set to be the same as the initial BV 440 (e.g., final BV is set as ($bv_x$, $bv_y$)).

In some embodiments, a final BV changes based on the minimum template cost position. For example, when the minimum template cost position is different with the initial BV of ($bv_x$, $bv_y$), the final BV can change. As illustrated in FIG. 4C, the initial BV 440 ($bv_x$, $bv_y$) points to pixel 442, and the minimum template cost position at integer resolution within a 5×5 search range (e.g., all illustrated pixels at integer positions) may be at (−1, −2), for example, corresponding to a pixel 448. In such scenarios, the final BV is set as ($bv_x$−1, $bv_y$−2), such that the final BV points to the pixel 448.

In some embodiments, the described sub-pel derivation method is applied conditionally. For example, when the minimum template cost position is different from the position associated with (e.g., pointed by) the initial BV, optionally by a difference in position that is less than a threshold, the above described sub-pel derivation method is not applied. In some scenarios, in accordance with a determination that a difference between the position pointed by the initial BV and the minimum template cost position is below a preset threshold, the computations associated with the sub-pel derivation method described above is not carried out at the decoder.

In some embodiments, when the minimum template cost position is at a boundary of the N×M search range, the above described sub-pel derivation method is not applied. For example, when the minimum template cost position is at the pixel 430 which is at a boundary of the 5×5 search window depicted in FIG. 4C, one or more of the additional positions used for the computation of the sub-pel position ($x_m$, $y_m$) in Equation 2 and Equation 3 would be outside the search range illustrated in FIG. 4C, and the above described sub-pel derivation method is not applied.

Figure 4D:
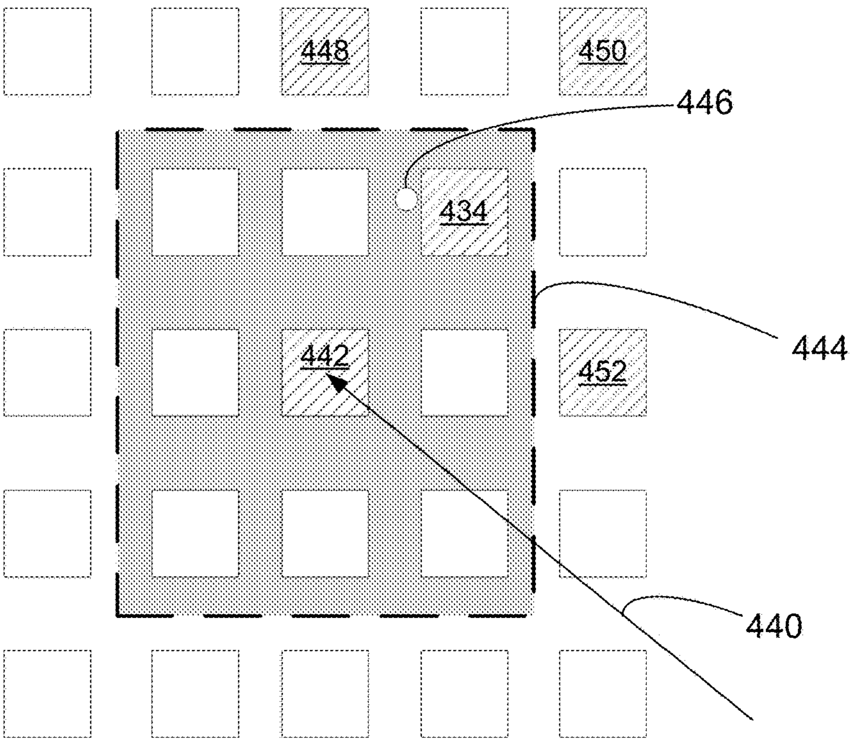
FIG. 4D illustrates an example sub-pel position derivation technique in accordance with some embodiments.

FIG. 4D illustrates an example sub-pel position derivation technique in accordance with some embodiments. In contrast to the positions used for determining the sub-pel position ($x_m$, $y_m$) illustrated in FIG. 4C, template costs from other pixels are used in the sub-pel derivation illustrated FIG. 4D. For example, a pixel 448, a pixel 450, the pixel 442, and a pixel 452, arranged in a cross pattern about the center pixel 434 having the minimum template cost are used to calculate the sub-pel position ($x_m$, $y_m$). For example, the template cost of the pixel 448 is denoted as cost E(−1,−1), the template cost of the pixel 450 is denoted as cost E(1,−1), the template cost of the pixel 452 is denoted as cost E(1,1), and the template cost of the pixel 442 is denoted as cost E(−1,1). In some embodiments, pixels at other integer positions are used to calculate the sub-pel position ($x_m$, $y_m$).

$$x_m = \frac{E(-1,-1) - E(1,-1)}{2(E(-1,-1) + E(1,-1) - 2E(0,0))} \quad \text{Equation 4}$$

$$y_m = \frac{E(1,-1) - E(1,1)}{2(E(1,-1) + E(1,1) - 2E(0,0))} \quad \text{Equation 5}$$

In some embodiments, as illustrated in FIG. 4D, costs of E(−1,−1), E(1,−1), E(−1,1), E(1,1) and E(0,0), associated with the pixel 448, the pixel 450, the pixel 442, the pixel 452, and the pixel 434, respectively, are used to derive the sub-pel position using, for example, Equations 4 and 5.

Figure 5B:
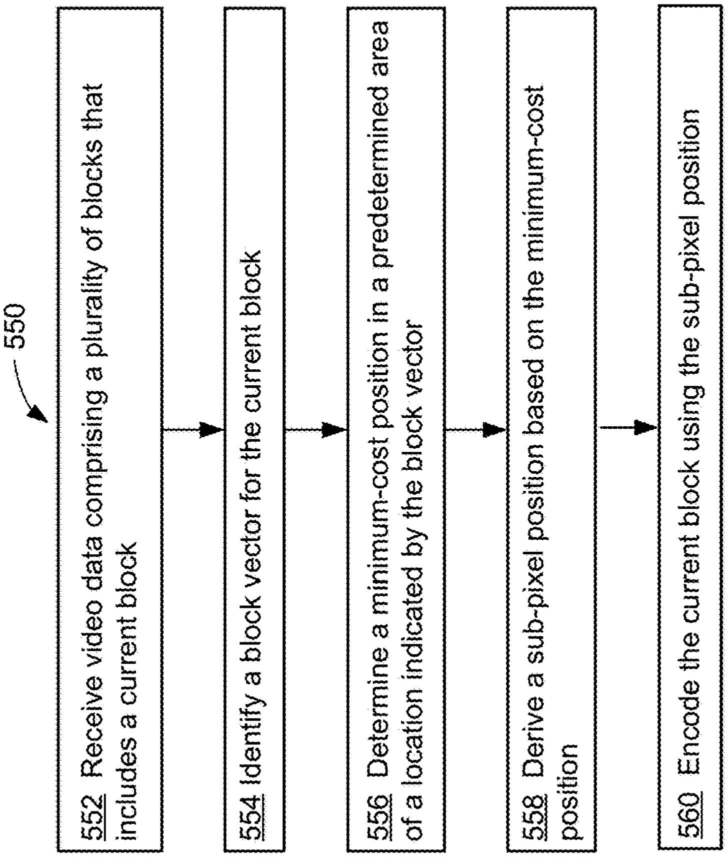
FIG. 5B illustrates an example video encoding process in accordance with some embodiments.
Figure 5A:
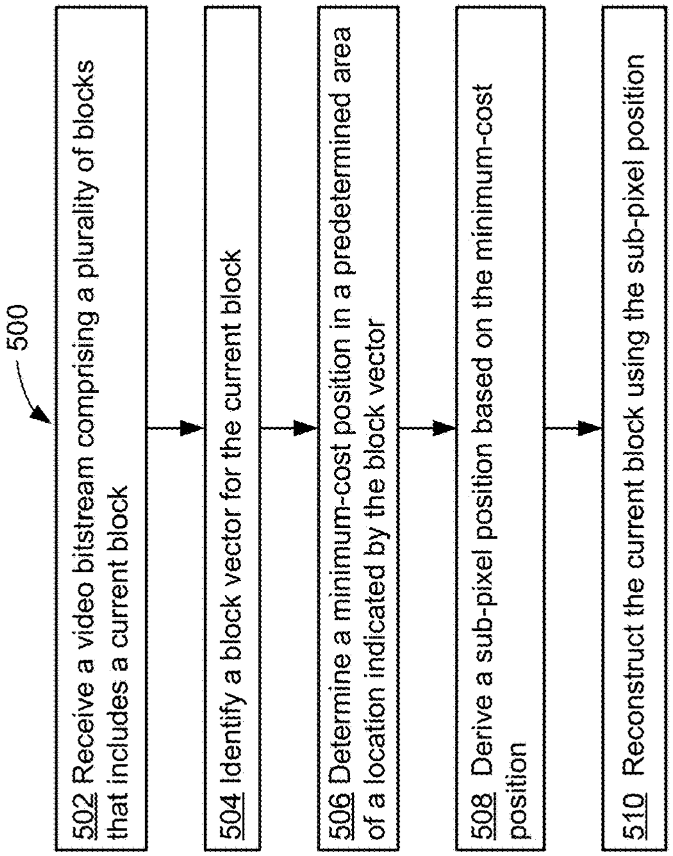
FIG. 5A illustrates an example video decoding process in accordance with some embodiments.

FIG. 5A is a flow diagram illustrating a method 500 of decoding video in accordance with some embodiments. The method 500 may be performed at a computing system (e.g., the server system 112, the source device 102, or the electronic device 120) having control circuitry and memory storing instructions for execution by the control circuitry. In some embodiments, the method 500 is performed by executing instructions stored in the memory (e.g., the memory 314) of the computing system.

The system receives (502) a video bitstream (e.g., a coded video sequence) comprising a plurality of blocks (e.g., corresponding to a set of pictures) that includes a current block. The system identifies (504) a block vector for the current block and determines (506) a minimum-cost position in a predetermined area of a location indicated by the block vector. The system derives (508) a sub-pixel position based on the minimum-cost position. The system reconstructs (510) the current block using the sub-pixel position. In this way, an implicit sub-pel position derivation method is used.

In some embodiments, the method 500 is applied when the current intra prediction mode is template matching-based intra prediction. In some embodiments, the method 500 is applied based on a flag. For example, when the method 500 is only one type of sub-pel prediction method, the flag indicates whether the method 500 is applied or not. For example, when the method 500 is one of a number of sub-pel prediction methods, the flag indicates whether the method 500 is selected or not.

In some embodiments, a sub-pel resolution is selected from among one or more resolutions. For example, the sub-pel resolution may be fixed as ¼ pel resolution. As another example, sub-pel resolution may be selected among {½, ¼, ⅛, 1/16} pel resolutions using an index syntax.

In some embodiments, when the minimum template cost position is different with the initial BV, the final BV does not change. For example, even though the initial BV is ($bv_x$, $bv_y$) and the minimum template cost position is (−1,−2) from a 5×5 search range, the final BV is still set to ($bv_x$, $bv_y$), e.g., to reduce coding complexity. In some embodiments, when the minimum template cost position is different from the initial BV, the final BV can change. For example, when the initial BV is ($bv_x$, $bv_y$) and the minimum template cost position is (−1,−2) from a 5×5 search range, the final BV is set to ($bv_x$−1, $bv_y$−2).

In some embodiments, any suitable type of searching method for minimum template cost position in integer resolution can be applied to find the position with minimum template cost within the N×M search window including, but not limited to, exhaustive full search, 3-step search, diamond search, hexagonal search, . . . , etc.

In some embodiments, the method 500 is applied conditionally. For example, when the minimum template cost position is different with the initial BV, the method 500 is not applied. For example, when the minimum template cost position is at a boundary of a N×M search range, the method 500 is not applied.

In some embodiments, the five costs used to derive a sub-pel position can be varied. For example, as shown in FIG. 4D, costs of {(−1, −1), (1, −1), (−1, 1), (1, 1), (0, 0)} are used to derive sub-pel position. In some embodiments, the five costs are in a t shape as shown in FIG. 4C. In some embodiments, the five costs are in an x shape as shown in FIG. 4D. In some embodiments, other numbers of costs and/or shapes are used.

FIG. 5B is a flow diagram illustrating a method 550 of encoding video in accordance with some embodiments. The method 550 may be performed at a computing system (e.g., the server system 112, the source device 102, or the electronic device 120) having control circuitry and memory storing instructions for execution by the control circuitry. In some embodiments, the method 550 is performed by executing instructions stored in the memory (e.g., the memory 314) of the computing system. In some embodiments, the method 550 is performed by a same system as the method 500 described above.

The system receives (552) video data (e.g., a source video sequence) comprising a plurality of blocks (e.g., corresponding to a set of pictures) that includes a current block. The system identifies (554) a bock vector for the current block and determines (556) a minimum-cost position in a predetermined area of a location indicated by the block vector. The system derives (558) a sub-pixel position based on the minimum-cost position. The system encodes (560) the current block using the sub-pixel position. As described previously, the encoding process may mirror the decoding processes described herein (e.g., template matching-based intra prediction described above). For brevity, those details are not repeated here.

Although FIGS. 5A and 5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 500) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream comprising a plurality of blocks that includes a current block; (ii) identifying a block vector for the current block; (iii) determining a minimum-cost position in a predetermined area of a location indicated by the block vector; (iv) deriving a sub-pixel position based on the minimum-cost position; and (v) reconstructing the current block using the sub-pixel position. For example, an implicit sub-pixel (also sometimes referred to as "sub-pel") position derivation method is introduced. Template costs used to derive a sub-pel position may be calculated within a predefined N×M search window from an initial block vector location, where N and M are non-zero positive integer value. Within the N×M template cost array, a minimum-template-cost position may be derived and considered as a center cost, E(0,0). The sub-pel position ($x_m$, $y_m$) may be derived from the center cost, e.g., by solving a parabolic equation with five known costs, including the center cost and four template costs around the center position as shown in Equations 2 and 3. As an example, the predetermined area may be a 3×3 search area, a 3×5 search area, a 5×5 search area, a 4×6 search area, a 6×6 search area, or other predefined area around the location indicated by the block vector. In some embodiments, the minimum-cost position is a minimum-template-cost position.

(A2) In some embodiments of A1, the block vector is identified by performing a template matching-based intra prediction for the current block. For example, the sub-pixel derivation can be always applied when the current intra prediction mode is a template matching-based intra prediction (intraTMP) mode.

(A3) In some embodiments of A1 or A2, the sub-pixel position is derived when a syntax element in the video bitstream indicates that a sub-pixel derivation mode is enabled for the current block. For example, the sub-pixel method can be applied according to a flag indicating whether the sub-pixel method is applied. In some embodiments, in accordance with a determination that the sub-pixel derivation mode is enabled for the current block, the sub-pixel position is derived based on the minimum-template-cost position. As an example, when the sub-pixel method is the only sub-pel prediction method, the flag indicates whether the sub-pixel method is applied.

(A4) In some embodiments of A3, when the syntax element in the video bitstream indicates that the sub-pixel derivation mode is disabled for the current block, the method includes reconstructing the current block using a pixel location indicated by the block vector. For example, when the syntax element indicates that the sub-pixel derivation mode is disabled, the current block is reconstructed using a pixel (rather than sub-pixel) location. In some embodiments, in accordance with a determination that the sub-pixel derivation mode is disabled for the current block (e.g., based on a value of the syntax element), the sub-pixel position is not derived for the current block.

(A5) In some embodiments of A3, the syntax element in the video bitstream indicates which sub-pixel derivation technique from a plurality of sub-pixel derivation techniques is to be applied for the current block. For example, when the sub-pixel method is one of a set of sub-pixel prediction methods, the flag indicates whether the sub-pixel method is selected.

(A6) In some embodiments of any of A1-A5, the sub-pixel position is derived according to a sub-pixel resolution. For example, a sub-pel resolution can be selected among at least one or more resolutions.

(A7) In some embodiments of A6, the sub-pixel resolution is selected from a set of two or more sub-pixel resolution candidates. For example, a sub-pel resolution is selected from among {½, ¼, ⅛, 1/16} pel resolutions with an index syntax. In some embodiments, the sub-pixel resolution is selected based on coded information (e.g., such as a block size of the current block, a magnitude of the block vector, and/or other coding information).

(A8) In some embodiments of A6, the sub-pixel resolution is a fixed value. For example, the sub-pixel resolution is fixed as ¼-pel resolution, ½-pel resolution, ⅛-pel resolution, or other resolution.

(A9) In some embodiments of any of A1-A8, deriving the sub-pixel position based on the minimum-cost position comprises updating the block vector to indicate the sub-pixel position. For example, when the minimum-template-cost position is different with the initial BV, the final BV can change. As a specific example, when initial BV is ($bv_x$, $bv_y$) and the minimum-template-cost position is (−1, −2), the final BV is set to ($bv_x$−1, $bv_y$−2). In some embodiments, deriving the sub-pixel position based on the minimum-template-cost position does not include updating the block vector. For example, the block vector may not be updated if the difference is less than a threshold distance, or if a cost difference between the initial position and the minimum-template-cost position is less than a threshold cost difference. In another example, the block vector may not be updated if the updated position would result in one or more reference samples being unavailable (e.g., being outside of a reconstructed area and/or not being available for the decoder). As a specific example, even though initial BV is ($bv_x$, $bv_y$) and the minimum-template-cost position is (−1, −2), the final BV may still be set to ($bv_x$, $bv_y$).

(A10) In some embodiments of any of A1-A9, the minimum-cost position is determined using a predetermined searching method. For example, any suitable searching method for the minimum-template-cost position in integer resolution can be applied to find the position with minimum template cost within the N×M search window, such as an exhaustive full search, a 3-step search, a diamond search, a hexagonal search, and the like. In some embodiments, the predetermined searching method is signaled in the video bitstream (e.g., via a high-level or block-level syntax). In some embodiments, the predetermined searching method is derived based on coded information (e.g., block size, block vector magnitude, and/or other coded information that is available to the coding component). In some embodiments, the predetermined searching method is selected from a set of two or more searching method candidates.

(A11) In some embodiments of any of A1-A10, the sub-pixel position is conditionally derived based on the minimum-cost position. For example, the sub-pixel derivation method can be applied conditionally (e.g., based on the minimum-template-cost position, the initial BV location, and/or other coded information).

(A12) In some embodiments of A11, the sub-pixel position is derived when the minimum-cost position is the same as the location indicated by the block vector; and the sub-pixel position is not derived when the minimum-cost position is different than the location indicated by the block vector. As an example, when the minimum-template-cost position is different with the initial BV, the sub-pixel derivation method is not applied.

(A13) In some embodiments of A11, the sub-pixel position is derived when the minimum-cost position is within a predefined distance of a boundary of the predetermined area; and the sub-pixel position is not derived when the minimum-cost position is not within the predefined distance of a boundary of the predetermined area. For example, when the minimum template cost position is boundary of N×M search range, the proposed method is not applied. In some embodiments, the sub-pixel position is derived in accordance with a determination that the minimum-template-cost position is at a boundary of the predetermined area. In some embodiments, the sub-pixel position is not derived in accordance with a determination that the minimum-template-cost position is not at the boundary of the predetermined area.

(A14) In some embodiments of any of A1-A13, wherein the sub-pixel position is derived using costs associated with 5 adjacent pixel locations. In some embodiments, sub-pixel position is derived using costs associated 2, 3, 4, 6, or other number of adjacent pixel locations. In some embodiments, the 5 adjacent pixel locations are a top, center, bottom, left, and right location, e.g., as illustrated in FIG. 4C. In some embodiments, the 5 adjacent pixel locations are fixed.

(A15) In some embodiments of A14, the 5 adjacent pixel locations correspond to a pixel location set selected from multiple pixel location set candidates. For example, the five costs used to derive the sub-pel position can be varied. As a specific example, the 5 adjacent pixel locations may be in a cross pattern, e.g., as illustrated in FIG. 4D.

(A16) In some embodiments of any of A1-A15, the minimum-cost position is determined using a sum of absolute differences. For example, a template cost can be a SAD, a SATD, an SSE, or the like.

(B1) In another aspect, some embodiments include a method (e.g., the method 550) of video encoding. In some embodiments, the method is performed at a computing system (e.g., the server system 112) having memory and control circuitry. In some embodiments, the method is performed at a coding module (e.g., the coding module 320). The method includes (i) receiving video data comprising a plurality of blocks that includes a current block; (ii) identifying a block vector for the current block; (iii) determining a minimum-cost position in a predetermined area of a location indicated by the block vector; (iv) deriving a sub-pixel position based on the minimum-cost position; and (v) encoding the current block using the sub-pixel position.

(B2) In some embodiments of B1, the method further includes signaling a syntax element in a video bitstream, the syntax element indicating that a sub-pixel derivation mode is enabled for the current block.

(B3) In some embodiments of B2, the syntax element indicates which sub-pixel derivation technique of a plurality of sub-pixel derivation techniques is to be used for the current block.

(B4) In some embodiments of any of B1-B3, the method further includes the encoding analog of any of the features of A2-A16 above.

(C1) In another aspect, some embodiments include a method of visual media data processing. In some embodiments, the method is performed at a computing system (e.g., the server system 112) having memory and control circuitry. In some embodiments, the method is performed at a coding module (e.g., the coding module 320). The method includes: (i) obtaining a source video sequence that comprises a plurality of frames; and; (ii) performing a conversion between the source video sequence and a video bitstream of visual media data according to a format rule, the video bitstream comprises a current block corresponding to a current picture; and the format rule specifies that: (a) a block vector is to be determined for the current block; (b) a minimum-cost position is to be determined in a predetermined area of a location indicated by the block vector; (c) a sub-pixel position is to be derived based on the minimum-cost position; and (d) the current block is to be reconstructed using the sub-pixel position.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A16, B1-B4, and C1 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A16, B1-B4, and C1 above).

Unless otherwise specified, any of the syntax elements (e.g., indicators) described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving a video bitstream comprising a plurality of blocks that includes a current block;

identifying a block vector for the current block;

determining a minimum-cost position in a predetermined area of a location indicated by the block vector;

deriving a sub-pixel position based on the minimum-cost position; and reconstructing the current block using the sub-pixel position, wherein the sub-pixel position is conditionally derived based on the minimum-cost position, including:

the sub-pixel position is derived when the minimum-cost position is within a predefined distance of a boundary of the predetermined area; and the sub-pixel position is not derived when the minimum-cost position is not within the predefined distance of a boundary of the predetermined area.

2. The method of claim 1, wherein the block vector is identified by performing a template matching-based intra prediction for the current block.

3. The method of claim 1, wherein the sub-pixel position is derived when a syntax element in the video bitstream indicates that a sub-pixel derivation mode is enabled for the current block.

4. The method of claim 3, further comprising, when the syntax element in the video bitstream indicates that the sub-pixel derivation mode is disabled for the current block, reconstructing the current block using a pixel location indicated by the block vector.

5. The method of claim 3, wherein the syntax element in the video bitstream indicates which sub-pixel derivation technique from a plurality of sub-pixel derivation techniques is to be applied for the current block.

6. The method of claim 1, wherein the sub-pixel position is derived according to a sub-pixel resolution.

7. The method of claim 6, wherein the sub-pixel resolution is selected from a set of two or more sub-pixel resolution candidates.

8. The method of claim 6, wherein the sub-pixel resolution is a fixed value.

9. The method of claim 1, wherein deriving the sub-pixel position based on the minimum-cost position comprises updating the block vector to indicate the sub-pixel position.

10. The method of claim 1, wherein the minimum-cost position is determined using a predetermined searching method.

11. The method of claim 1, wherein:

the sub-pixel position is derived when the minimum-cost position is the same as the location indicated by the block vector; and the sub-pixel position is not derived when the minimum-cost position is different than the location indicated by the block vector.

12. The method of claim 1, wherein the sub-pixel position is derived using costs associated with 5 adjacent pixel locations.

13. The method of claim 12, wherein the 5 adjacent pixel locations correspond to a pixel location set selected from multiple pixel location set candidates.

14. The method of claim 1, wherein the minimum-cost position is determined using a sum of absolute differences.

15. A method of video encoding performed at a computing system having memory and one or more processors, the method comprising:

receiving video data comprising a plurality of blocks that includes a current block;

identifying a block vector for the current block;

determining a minimum-cost position in a predetermined area of a location indicated by the block vector;

deriving a sub-pixel position based on the minimum-cost position; and encoding the current block using the sub-pixel position, wherein the sub-pixel position is conditionally derived based on the minimum-cost position, including:

the sub-pixel position is derived when the minimum-cost position is within a predefined distance of a boundary of the predetermined area; and the sub-pixel position is not derived when the minimum-cost position is not within the predefined distance of a boundary of the predetermined area.

16. The method of claim 15, further comprising signaling a syntax element in a video bitstream, the syntax element indicating that a sub-pixel derivation mode is enabled for the current block.

17. The method of claim 16, wherein the syntax element indicates which sub-pixel derivation technique of a plurality of sub-pixel derivation techniques is to be used for the current block.

18. A non-transitory computer-readable storage medium storing a video bitstream that is generated by a video encoding method, the video encoding method comprising:

receiving video data comprising a plurality of blocks that includes a current block;

identifying a block vector for the current block;

determining a minimum-cost position in a predetermined area of a location indicated by the block vector;

deriving a sub-pixel position based on the minimum-cost position; and encoding the current block using the sub-pixel position, wherein the sub-pixel position is conditionally derived based on the minimum-cost position, including:

the sub-pixel position is derived when the minimum-cost position is within a predefined distance of a boundary of the predetermined area; and the sub-pixel position is not derived when the minimum-cost position is not within the predefined distance of a boundary of the predetermined area.

* * * * *